Figure 1:
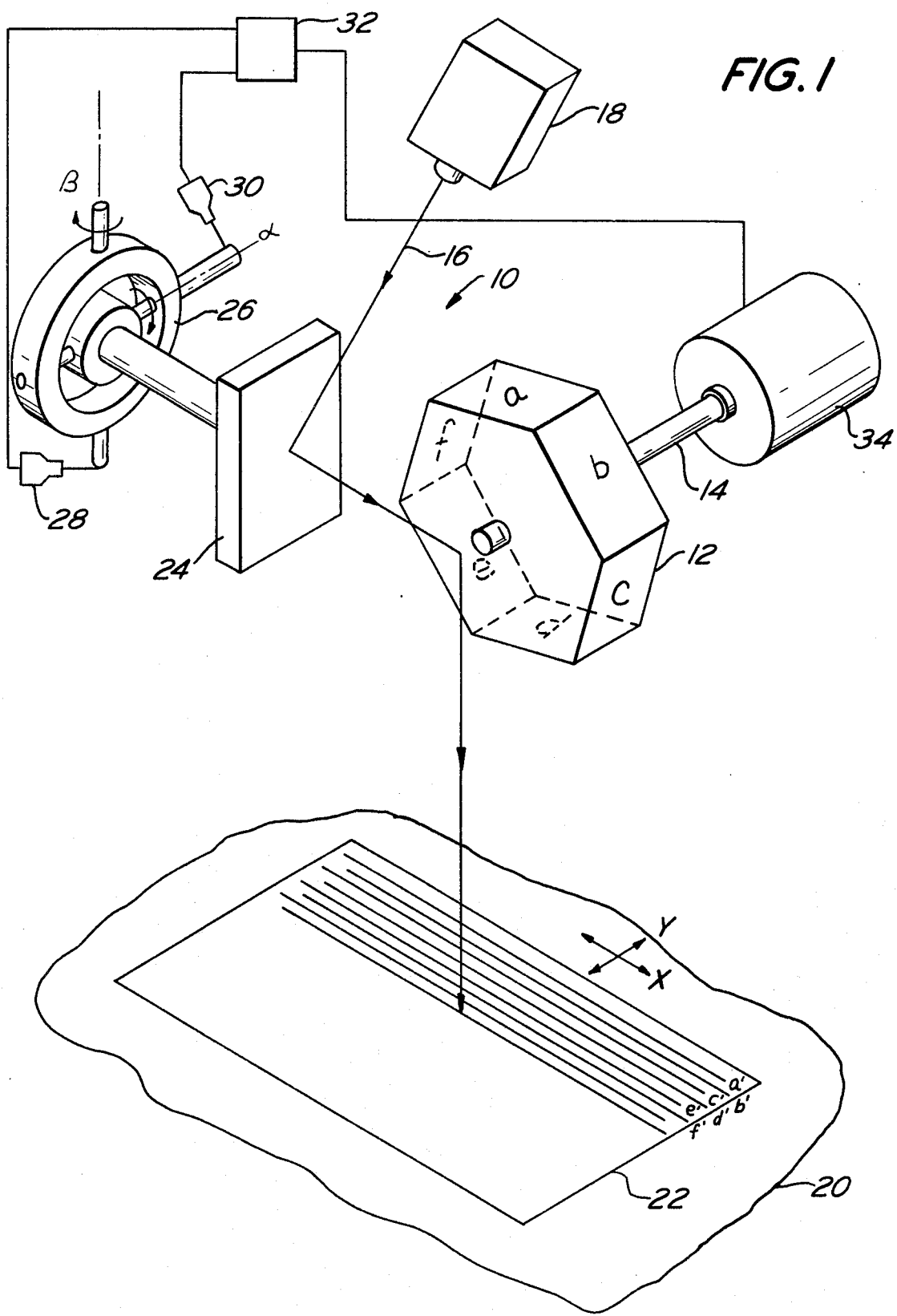

United States Patent [19]

Brown et al.

[11] 4,002,830
[45] Jan. 11, 1977

[54] APPARATUS FOR COMPENSATING FOR OPTICAL ERROR IN A ROTATIVE MIRROR

[75] Inventors: John Buchanan Brown, Lincoln; Frank J. Gardiner, Weston, both of Mass.

[73] Assignee: Laser Graphic Systems Corporation, Sudbury, Mass.

[22] Filed: Jan. 22, 1975

[21] Appl. No.: 543,082

[52] U.S. Cl. .................. 358/293; 178/DIG. 28; 350/7
[51] Int. Cl.² .................. G02D 17/00; H04M 5/84
[58] Field of Search .......... 178/7.6, 7.7, 6.6 R, 178/6.7 A, 6, 7.1, DIG. 28; 350/7

[56] References Cited
UNITED STATES PATENTS

| 3,461,227 | 8/1969 | Perreault | 178/6 |
| 3,465,352 | 9/1969 | Carlson | 178/6.6 R |
| 3,809,806 | 5/1974 | Walker | 178/7.6 |

Primary Examiner—Robert L. Griffin
Assistant Examiner—Edward L. Coles
Attorney, Agent, or Firm—Seidel, Gonda & Goldhammer

[57] ABSTRACT

Inherent defects in the angular relationship between facets of a rotating polygonal mirror used to sequentially scan a beam of radiation are corrected by an optical reflecting or refracting element pivotally mounted in the path of the radiation. With the use of electromechanical devices energized by timed electrical signals of appropriate value, the mirror or refracting element is pivoted to correct the scanning errors caused by angular defects in the rotating mirror. The effect of variations in the angles between facets of the polygonal mirror are also corrected by an electronic circuit which includes a delay device capable of delaying the scanning by a predetermined amount. Control means for the electromechanical devices and for the delay device are pre-programmed so as to make the proper adjustments for each facet of the rotating polygonal mirror.

9 Claims, 3 Drawing Figures

U.S. Patent  Jan. 11, 1977  Sheet 1 of 3  4,002,830

APPARATUS FOR COMPENSATING FOR OPTICAL ERROR IN A ROTATIVE MIRROR

This invention relates to apparatus for compensating for optical errors in a rotating mirror used for optical scanning.

Lasers have recently been proposed for use in the printing and graphic arts to reproduce originals or paste-ups onto printing or photographic plates. In such devices, it is necessary to cause coherent or other forms of radiation to move across a surface. This may be accomplished by using a rotating mirror or prism to scan the radiation. Polygonal mirrors may be used for this purpose.

In U.S. Pat. application Ser. No. 86,656, now U.S. Pat. No. 3,832,948, a beam of coherent radiation is scanned across a surface to form a printing plate. This can be accomplished using a polygonal mirror. Since each facet of the mirror is used to scan the radiation, one rotation of, for example, a six-sided mirror, creates six scan lines. By indexing the surface over which the radiation scans in time with the rotation of the mirror, six parallel scan lines are created. It is, of course, desirable that each scan line start and end at the same point and that they be evenly spaced from each other. In fact, for many applications (e.g., high quality printing) it is necessary that the tolerances of the scan lines be accurate within arc seconds. Unfortunately, mirrors which will scan the radiation that accurately are relatively expensive.

There are two types of errors which are inherent in commercially available mirrors and which can cause defects in the scanning operation. The first of these errors is the deviation of each facet from being parallel to the axis of rotation of the mirror. Such deviations in the apex angle cause variations in the spacing between the scan lines. The second error is caused by the variations in the angles between the facets of the mirror. These variations cause each scan line to begin and end at different points.

The present invention is designed to correct the above-mentioned defects. This is accomplished by pivotally mounting a radiation deflecting means in the path of the radiation between the source and the surface over which the radiation is scanned. With the use of electromechanical transducers, the radiation deflecting means can be automatically pivoted so as to compensate for the defects in the mirror. Since the mirror defects are fixed (i.e., they do not vary with time), the radiation deflecting means need only be pivoted once for each facet of the mirror.

The present invention also provides an electronic circuit means which can be used in place of the radiation deflecting means to compensate for the variations in the angles between the facets of the mirror. This circuit includes a time delay device capable of delaying the scanning operation by a predetermined amount for each facet. Thus, for each facet of the rotating mirror the scanning operation is delayed by an amount necessary to compensate for the angular variations.

Further details of the novel features of the present invention will become apparent from a consideration of the following description taken in conjunction with the accompanying drawings which illustrate presently prefered forms of the invention; it being understood, however, that this invention is not limited to the precise arrangements and instrumentalities shown.

Figure 2B:
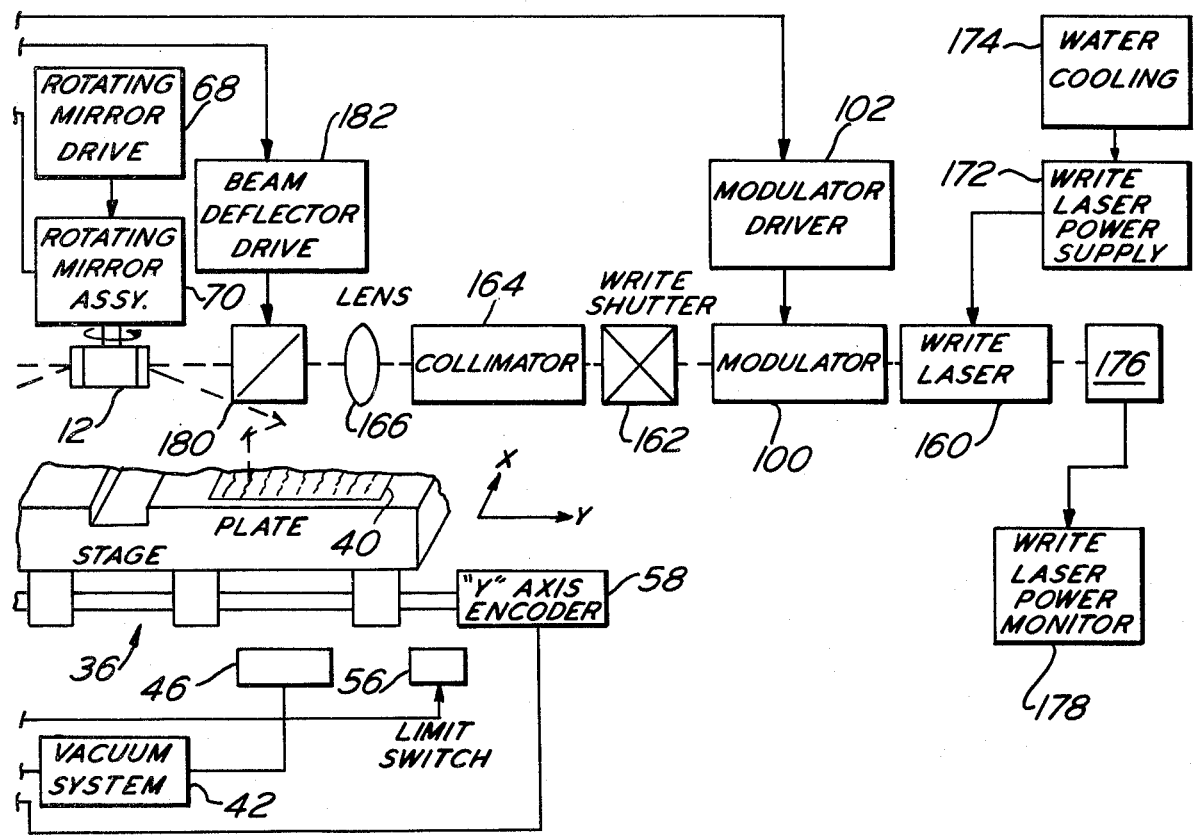
Figure 2A:
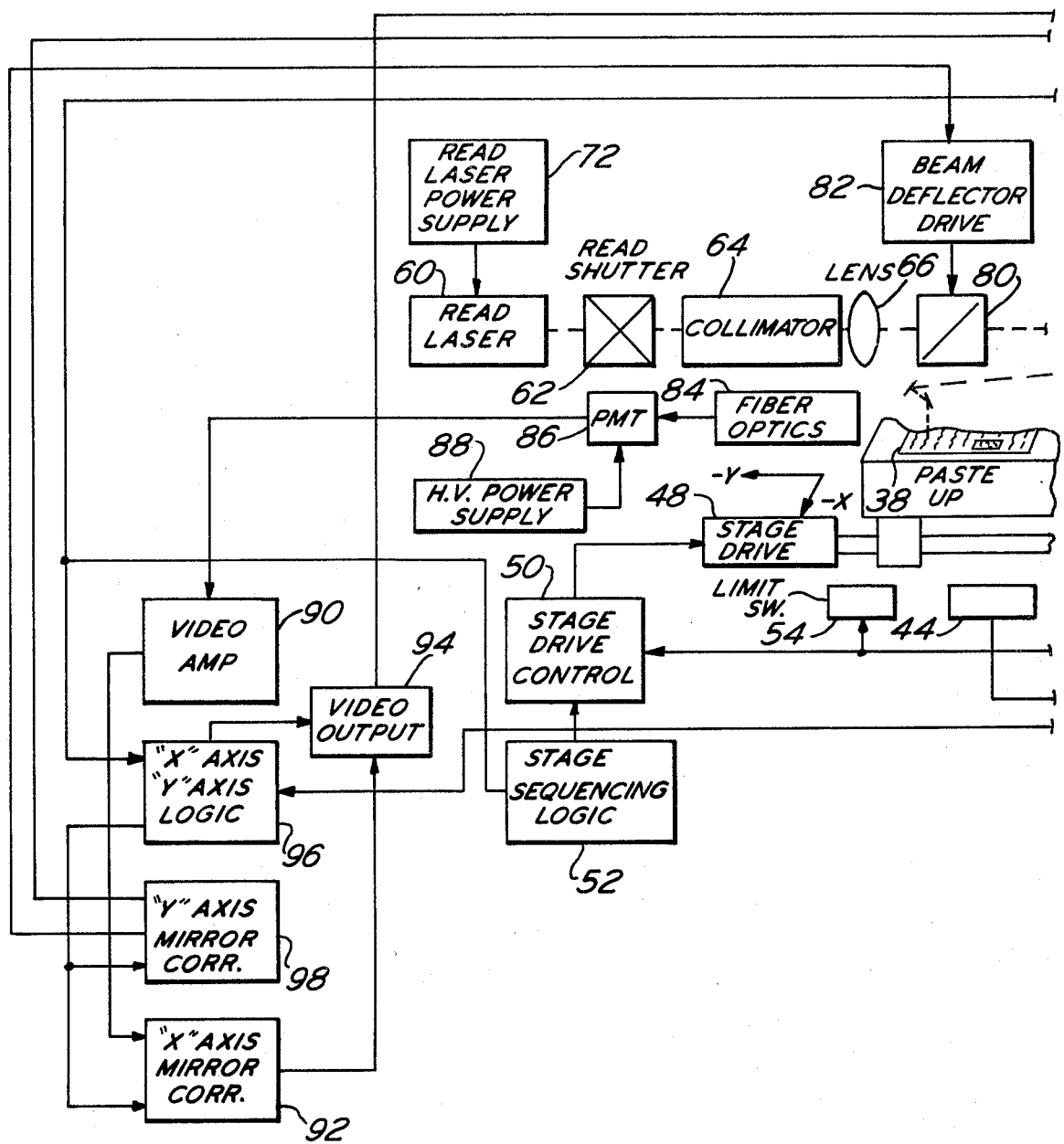

FIG. 1 is a diagrammatic representation of the essential parts of an optical scanning device according to the present invention, and FIGS. 2a and 2b are a diagrammatic representation of a complete system constructed in accordance with the principals of the present invention.

Referring first to FIG. 1 which shows a basic laser scanning assembly 10, it can be seen that as the hexagonal mirror 12 is rotated about its axis 14 the radiation 16 from source 18 is reflected from each of the mirror facets a–f and is directed toward the scan area 20. Since each reflecting facet of the rotating mirror causes the radiation beam 16 to make one complete scan of the scan area, one rotation of the mirror creates six scan lines. These lines are indicated as $a'-f'$ on the scan area 20. In order to prevent the scan lines from merely falling on top of each other, the material 22 being operated upon and lying within the scan area 20 is indexed in the direction Y after each scan is completed. In other words, for each facet ($a-f$) of the hexagonal mirror 12 the material 22 is indexed once and for a complete revolution of the mirror 12 the material is indexed six times. It should be understood that the hexagonal mirror 12 is but one example of a polygonal mirror or prism having any number of facets (2 or more) which can be used with the present invention.

It is of course desirable to have all of the scan lines begin and end at the same point and be evenly spaced from each other. As described above, there are two basic types of defects inherent in such rotating mirrors. The first is a result of apex angle errors, i.e., the deviation of each mirror facet from being parallel to the axis of rotation of the mirror and the second is the variation in the angles between the facets. The first defect varies the spacing between the scan lines and the second defect causes the scan lines to begin and end at different points, as seen in FIG. 1.

In accordance with the present invention these defects found in rotating mirrors are compensated by using a second reflector 24 mounted between the rotating mirror and the radiation source 18 which, by way of example is a laser. This mirror 24 is mounted on a gimbal 26 so that it can be pivoted about two mutually perpendicular axes $\alpha$ and $\beta$. As should be obvious from the drawing, when mirror 24 is pivoted about axis $\beta$, the laser beam is made to move axially along the rotating mirror. Consequently, the beam reflected from the rotating mirror is made to move in the direction Y. Similarly, when the mirror 24 is pivoted about axis $\alpha$, the beam is made to move in the direction X. Since the above-mentioned defects in the rotating mirror 12 can be accurately determined and measured, the amount of correction necessary for each facet can also be determined. Therefore, the amount and direction of movement of the mirror 24 necessary to correct the defects can be determined. Once these determinations are made, mirror 24 need be moved at most N times for each rotation of mirror 12 where N is the number of facets in the rotating scanning device. The same sequence of movements is repeated for each subsequent rotation of mirror 12.

Electrical to mechanical transducers such as elements 28 and 30 are controlled by logic circuit 32 and in turn are used to control the movement of mirror 24. These elements 28 and 30 are synchronized to the movement of rotating mirror 12 through encoder 34 so that mirror 24 is automatically indexed to the proper position, i.e., to the position corresponding to the particular reflecting face a–f presently scanning.

It should be noted that in practical applications the entire facet width is not actively used to scan the radiation. The first part of each scan is utilized as dead time in which to make necessary corrections. Thus, in a six-sided mirror where each scan is 60°, 40° may be used for active scanning with the first 20° allowing time for making corrections by indexing the mirror.

It should also be noted that the reflecting mirror 24 could be replaced by a refracting device that shifts the radiation as it passes through the refractory material. Additionally, it should be readily apparent that while the mirror 24 is illustrated as being mounted for pivotal movement in a gimbal, it may be more advantageous in some cases to use two separate mirrors each capable of single angular motion.

In lieu of the reflecting mirror 24, it is also possible to electronically correct the facet-to-facet angular defects found in the rotating mirror 12. As fully explained above, facet-to-facet angular errors result in variations in the beginning of the scan lines. In a real time situation, these variations are actually differences in the time in which the scan lines begin. Accordingly, the facet-to-facet or angular errors can be corrected by delaying electronic signals. FIGS. 2a and 2b diagrammatically show a complete laser scanning read and write system which utilizes both of the above techniques.

Referring to FIGS. 2a and 2b, it can be seen that a single rotating mirror 12 is used for scan reading an original or paste-up and for scan writing onto a photosensitive or plastic printing plate such as may be used for letterpress printing. The arrangement comprises a stage assembly 36 having an original 38 to be copied mounted on the left side thereof and a plate 40 to be written upon mounted on the right side. The plate 40 may be written upon by, for example, ablating or otherwise removing selected portions thereof using a laser. Both the original 38 and plate 40 are held in position by means of a vacuum system 42 including plenums 44 and 46. The stage is mounted so that it can be indexed in the direction Y by means of the stage drive 48, stage drive control circuit 50 and stage sequence logic circuit 52. Limit switches 54 and 56 are located at either end of the stage 36 and are used to indicate when the stage assembly has reached its initial and final positions. Y axis encoder 58 senses the indexing of the stage 36 and generates signals indicating its exact position.

Except for the modulator 100 which is used to modulate the writing laser beam, the optical system for both reading and writing are similar. Each system comprises a laser 60 or 160 and conventional shutters 62 or 162, collimators 64 or 164 and lenses 66 or 166. These latter elements are used to focus the laser radiation on the stage 36 below rotating mirror 12 which is driven by drive motor 68 and drive assembly 70. Assembly 70 also includes an encoder which generates a coded signal such as a pulse or pulse train after each mirror facet has passed a fixed point. These pulses indicate which mirror facet is in the operative scan position. Each laser is driven by its respective power supply 72 or 172 which can include a water cooling device 174. In addition, the power of each laser can be monitored by a sensing device such as 176 and a monitor device such as 178. Radiation deflecting elements 80 and 82 are positioned in the paths of the read laser beam and write laser beam, respectively, intermediate the rotating mirror 12 and lens 66 and 166. They are pivotally mounted about axes which are perpendicular to the mirror axis. Each deflecting element is driven by a beam deflector drive means 82 or 182 which is comprised of an electromechanical transducer. In the manner described above with reference to FIG. 1, beam deflecting elements 80 and 180 are used for correcting defects in the apex angle of the facets of rotating mirror 12.

A fiber optics assembly 84 is used to detect the information on the original 38 as it is scanned by the read laser beam. Optical signals from assembly 84 are transduced into electrical signals with the use of a photomultiplier tube 86 and its associated power supply 88. These electrical signals are then amplified and digitized by a video amplifier 90 and are then fed to the X-axis mirror corrector circuit 92. Circuit 92 comprises a clock and a shift register and is used to delay the transfer of the digital video input signals to the digital video output circuit 94.

The pulses from the encoder within the rotating mirror assembly 70 are fed to the stage drive control circuit 50 and an XY logic circuit 96. Logic circuit 96 comprises a counter and an address buffer and has an output which is fed to the digital video output circuit 94, the Y-axis mirror corrector 98 and the X-axis mirror corrector 92. Y-axis mirror corrector 98 comprises a memory, address buffer, and digital to analog converter and is used to control the beam deflector drive units 82 and 182. The output of video output circuit 94 is fed to the modulator driver 102 in order to control modulator 100.

The system shown in FIGS. 2a and 2b operates as follows. An original writing 38 or some other form of indicia which is to be copied is placed on the left side of the stage assembly 36 and a photosensitive or plastic plate or material 40 is placed on the right side. As the rotating mirror 12 is rotated in the direction indicated by the arrow, the read laser radiation is made to scan across the original in the −X direction and the write laser beam is caused to scan across the plate 40 in the +X direction, one scanning operation occurring for each facet of the rotating mirror 12. After each scan the stage is indexed in the +Y direction to prepare for the next scan. This indexing operation is synchronized with the rotation of the mirror by the output of the rotating mirror assembly encoder which is fed to the stage sequence logic circuit 52. Alternatively, the stage assembly 36 could be slowly and continuously moved in the +Y direction. During the scanning operation, the fiber optics element 84 detects reflected radiation. This optical information which varies due to values of light and dark on the writing 38 is converted into electrical signals by the photomultiplier tube 86 which are then amplified by video amplifier 90 and are transferred via X-axis mirror corrector circuit 92 and video output circuit 94 to the modulator driver 102. Modulator 100, driven by modulator driver 102, operates to turn the write laser beam on and off in response to the signals originating at the fiber optics element 84.

Pulses from the rotating mirror assembly encoder are also fed to the XY logic circuit 96. The XY logic circuit 96 processes these pulses to develop an instruction signal which is sent to the Y-axis mirror corrector circuit 98 and the X-axis mirror corrector circuit 92. Y-axis mirror corrector circuit 98 includes a memory which is preprogrammed with six digital signals, one preprogrammed signal for each facet of the six-sided mirror. The instruction signal from the XY logic circuit 96 is used to select the appropriate preprogrammed digital signals from the memory. Two of these preprogrammed digital signals are selected, one corresponding to the mirror facet in the read position and the other corresponding to the mirror facet in the write position. These preprogrammed digital signals are then converted into analog signals. Since each of the preprogrammed digital signals is proportional to the amount by which each corresponding facet of the six-sided rotating mirror is not parallel to the mirror axis, the two analog signals are proportional to the defects in the read facet and write facet respectively. One of these two analog signals is therefore used to drive deflector 80 and the other is used to drive deflector 180. This insures proper spacing between the scanning lines in both the read and write operations.

As mentioned above, the video output circuit 94 drives the modulator 100 by way of modulator driver 102 and the modulator 100 is used to turn the write laser on and off in response to signals received from the fiber optics element 84. Therefore, the output of the video output device 94 is in digital form. If this video output is delayed by a certain amount for each scan, then all of the scanning lines can be made to start at the same point. Accordingly, the X-axis mirror corrector 92, which comprises a clock and a shift register functioning as a buffer, delays the transfer of the video signals from the video amplifier 90 to the video output circuit 94 in accordance with a particular present variation from a base level. There are six delays per rotation of the mirror and the amount of each delay depends upon the amount of facet-to-facet angle variation.

In a system such as the one shown in FIGS. 2a and 2b, both the read facet and write facet of the rotating mirror 12 can affect the location of the laser printing along the X-axis. However, in order to eliminate the facet-to-facet angular errors at the read side, the X-axis mirror corrector circuit 92 is designed so that it does not actually begin reading, i.e., video data is inhibited at its input, until a begin read signal is received at the input. This signal is produced by a vertical column of coded indicia adjacent the left side of the original 38 and is used as the base level referred to above. In this way, each read operation is made to being at the same position along the X-axis regardless of the time at which the scanning radiation reaches that position. Alternatively, it is also possible to adjust the six delay times preset in X-axis mirror corrector 92 to account for facet-to-facet errors in both the read and write facets. If this were done then the delay times would be proportional to the difference in the facet-to-facet errors of each pair of read and write facets.

While the preferred embodiment described above utilizes a single rotating mirror for both the read and write scanning operations, it should be clear that two separate but synchronized rotating mirrors could be used. If this is done, means must be provided for ensuring that the mirrors are synchronized. This can also be accomplished by the use of a delaying technique similar to that described above. In such a system the amount of delay would be determined by the amount of desynchronization. This information could be obtained from the encoders. Furthermore, the present invention is also applicable to a system which uses a rotating polygonal mirror for scanning only the write laser. In such a system, the video signals used to modulate the write laser can be obtained from an external source, such as a magnetic tape or disc memory, where they had been previously stored, or they can be obtained from a similar read scanning system operating at some remote location. In either case, these video signals can be transmitted to the write laser via conventional communication paths, such as telephone lines or the like.

Even if only a write scanning operation is to be performed, it should be obvious that angular defects in the polygonal mirror will affect the location of the writing by the write laser. In addition, the location of the writing may be affected by the position of the incoming information from the external source. These errors, however, can be easily corrected using the techniques described above. The system shown in FIGS. 2a and 2b is readily adaptable to a write only system. This can be accomplished by eliminating the read laser and optical system and replacing the fiber optics member and photomultiplier tube with a transmission line or the like which carries the optical signals from the external source. With this arrangement the base or reference levels from which the delays are measured can be established by the use of signals such as the "begin read" signals sent at the appropriate time from the external source. These signals would represent the beginning of a line of information. Alternatively, reference or base level signals could be provided by the encoder. The removal and replacement operation described above can be done either permanently or through switching means, in which case the total system could then selectively perform either both a read and write operation or simply a write operation.

The present invention may be embodied in other specific forms without departing from the spirit or essential attributes thereof and, accordingly, reference should be made to the appended claims, rather than to the foregoing specification as indicating the scope of the invention.

It is claimed:
1. An optical scanning apparatus comprising:
a polygonal radiation deflecting device for scanning radiation across a surface and means mounting said device for rotation about an axis substantially parallel to a plurality of radiation deflecting facets on said device, said plurality of facets being substantially congruent and the angles between each pair of adjacent facets being substantially equal;
means for compensating for optical errors in the angular relationship of said facets;
said compensating means comprising radiation deflecting means positioned intermediate a source of radiation and said surface for deflecting the radiation to be deflected by said facets, at least part of said deflecting means being movable in a first direction such that movement in said first direction would cause said radiation to move along said surface in a direction parallel to the direction of scan;
wherein at least part of said deflecting means is movable in a second direction such that movement in said second direction would cause said radiation to move along said surface in a direction perpendicular to the direction of scan and wherein each of at least some of said signals in said set is proportional to the error in the angle between a facet and said axis of said device;
electro-mechanical transducer means operatively associated with said deflecting means for moving said deflecting means in response to electrical signals applied to said transducer means; and means for generating a set of signals synchronized to the rotation of said polygonal deflecting device, each of at least some of said signals said set being proportional to the error in the angle between a pair of facets.

2. An optical scanning apparatus as claimed in claim 1 wherein said polygonal radiation deflecting device is a polygonal mirror.

3. An optical scanning device as claimed in claim 1 wherein said deflecting means comprises radiation refraction means.

4. An optical scanning device as claimed in claim 1 wherein said deflecting means comprises radiation reflecting means.

5. An optical scanning apparatus as claimed in claim 1 wherein said radiation deflecting means is located between said source of radiation and said polygonal deflecting device.

6. An optical scanning apparatus as claimed in claim 1 further including a modulator means for changing the intensity of the radiation in response to signals supplied to said modulator means.

7. An optical scanning apparatus as claimed in claim 1 further including an optical to electrical transducer means positioned to receive reflected radiation from said surface for generating signals indicative of the intensity of the reflected radiation.

8. An optical scanning apparatus comprising:
a polygonal radiation deflecting device for scanning radiation across a surface and means mounting said device for rotation about an axis substantially parallel to a plurality of radiation deflecting facets on said device, said facets being substantially congruent and the angles between each pair of adjacent facets being substantially equal;

modulator means for changing the intensity of the radiation in response to signals applied to said modulator means;

means for compensating for optical errors in the angular relationship of said facets;

said compensating means comprising a time delay device positioned in front of said modulator, said delay device being capable of selectively delaying said application of signals to said modulator for a plurality of independent predetermined amounts, each of said amounts being proportional to the angle between a pair of facets.

9. An optical scanning apparatus as claimed in claim 8 wherein said compensating means further comprises radiation deflecting means positioned intermediate the source of radiation and said surface for deflecting the radiation to be deflected by said facets, said deflecting means being mounted for movement for varying the amount of deflection of said radiation, electromechanical transducer means operatively associated with said deflecting means for moving said deflecting means in response to electrical signals applied to said transducer means and means for generating a set of signals synchronized to the rotation of said polygonal deflecting device, said signals in said set being of a value when applied to said transducer means to effect movements of said radiation deflecting means by amounts sufficient to compensate for errors in the angles between said facets and said axis.

* * * * *